(12) United States Patent
Dussardier et al.

(10) Patent No.: US 12,508,742 B2
(45) Date of Patent: Dec. 30, 2025

(54) MIXING AND EXTRUSION MACHINE WITH SELF-CLEANING TWIN SCREW AND METHOD OF USE

(71) Applicant: COMPAGNIE GENERALE DES ETABLISSEMENTS MICHELIN, Clermont-Ferrand (FR)

(72) Inventors: Bruno Dussardier, Clermont-Ferrand (FR); Aurelien Tournebize, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 886 days.

(21) Appl. No.: 17/436,517

(22) PCT Filed: Feb. 25, 2020

(86) PCT No.: PCT/EP2020/054850
§ 371 (c)(1),
(2) Date: Sep. 3, 2021

(87) PCT Pub. No.: WO2020/178070
PCT Pub. Date: Sep. 10, 2020

(65) Prior Publication Data
US 2022/0258379 A1    Aug. 18, 2022

(30) Foreign Application Priority Data

Mar. 6, 2019    (FR) ........................................ 1902285

(51) Int. Cl.
*B29B 7/20*    (2006.01)
*B29B 7/18*    (2006.01)
(Continued)

(52) U.S. Cl.
CPC ................ *B29B 7/20* (2013.01); *B29B 7/183* (2013.01); *B29B 7/26* (2013.01); *B29B 7/7495* (2013.01);
(Continued)

(58) Field of Classification Search
CPC ... B29C 48/525; B29C 48/402; B29C 64/145; B29C 64/129; B29C 64/135;
(Continued)

(56) References Cited

U.S. PATENT DOCUMENTS 1,370,398 A    3/1921  Banbury
2,466,934 A    4/1949  Dellenbarger
(Continued)

FOREIGN PATENT DOCUMENTS

CN    1860010 A    11/2006
CN    101842204 A    9/2010
(Continued)

OTHER PUBLICATIONS

"Marry", Merriam-Webster, accessed at https://www.merriam-webster.com/dictionary/marry on Sep. 27, 2024. (Year: 2024).*
(Continued)

*Primary Examiner* — JaMel M Nelson
(74) *Attorney, Agent, or Firm* — VENABLE LLP

(57) ABSTRACT

A mixing and extrusion machine (10) for the manufacture of rubber mixtures has a mixer with a converging conical twin screw (12) with a fixed frame (14) that supports sleeves (16). Two screws (18), being mounted at an angle, are mounted in the mixer (12) so as to move in translational movement between an opening (22) arranged upstream and an outlet (25) arranged downstream of the sleeves, so that the thread tips of each screw contact tangentially the surfaces of the opposite screw so that the screws remain substantially in contact with each other when the screws rotate at an angle (Continued)

and at a center distance that facilitates self-cleaning. The screw threads maintain tangential contact with the inner surfaces of the sleeves, thus preventing the retention of mixing material on these surfaces.

15 Claims, 10 Drawing Sheets

(51) Int. Cl.
- B29B 7/26 (2006.01)
- B29B 7/74 (2006.01)
- B29B 7/80 (2006.01)
- B29C 48/40 (2019.01)
- B29C 48/525 (2019.01)

(52) U.S. Cl.
CPC ............ B29B 7/802 (2013.01); B29C 48/402 (2019.02); B29C 48/525 (2019.02)

(58) Field of Classification Search
CPC ..... B29C 64/255; B29C 64/364; B29B 7/183; B29B 7/26; B29B 7/7495; B33Y 10/00; B33Y 30/00; B33Y 40/00
See application file for complete search history.

(56) References Cited

U.S. PATENT DOCUMENTS

| | | | |
|---|---|---|---|
| 3,288,077 A | 11/1966 | Meskat | |
| 3,951,389 A | 4/1976 | Porter | |
| 3,975,126 A * | 8/1976 | Wireman | B29C 48/08 425/141 |
| 4,131,371 A | 12/1978 | Tynan | |
| 4,300,839 A | 11/1981 | Sakagami | |
| 4,702,608 A | 10/1987 | Garbar et al. | |
| 4,818,113 A | 4/1989 | Patel | |
| 4,824,256 A | 4/1989 | Haring et al. | |
| 5,056,800 A * | 10/1991 | Becker | B29B 7/22 277/429 |
| 5,183,640 A | 2/1993 | Peter et al. | |
| 5,324,107 A | 6/1994 | Tanaka et al. | |
| 5,593,226 A | 1/1997 | Peter | |
| 5,865,535 A | 2/1999 | Edwards | |
| 5,967,025 A | 10/1999 | Tashiro | |
| 6,022,133 A | 2/2000 | Herring et al. | |
| 7,404,664 B2 * | 7/2008 | Borzenski | B29B 7/183 366/76.7 |
| 7,556,419 B2 | 7/2009 | Colombo | |
| 8,517,714 B2 | 8/2013 | Matsumoto et al. | |
| 9,463,581 B2 | 10/2016 | Yamaguchi et al. | |
| 10,124,511 B2 | 11/2018 | Renard et al. | |
| 10,259,147 B2 | 4/2019 | Monnereau et al. | |
| 10,471,627 B2 | 11/2019 | Juillard et al. | |
| 11,351,700 B2 | 6/2022 | Le-Bars et al. | |
| 2005/0226093 A1 | 10/2005 | Yada et al. | |
| 2007/0159916 A1 | 7/2007 | Colombo | |
| 2009/0040867 A1* | 2/2009 | Schulz | B29B 7/484 425/204 |
| 2010/0271901 A1 | 10/2010 | Yamaguchi et al. | |
| 2011/0091596 A1 | 4/2011 | Saiuchi et al. | |
| 2011/0123659 A1* | 5/2011 | Matsumoto | B29C 48/35 425/224 |
| 2015/0360398 A1 | 12/2015 | Monnereau et al. | |
| 2016/0001463 A1 | 1/2016 | Miura | |
| 2017/0165872 A1* | 6/2017 | Renard | B29B 7/186 |
| 2018/0147746 A1 | 5/2018 | Inoue et al. | |
| 2018/0243945 A1 | 8/2018 | Renard et al. | |
| 2018/0290338 A1 | 10/2018 | Juillard et al. | |
| 2018/0370074 A1 | 12/2018 | Ougier et al. | |
| 2019/0176363 A1 | 6/2019 | Le-Bars et al. | |
| 2019/0193036 A1 | 6/2019 | Sakamoto | |
| 2022/0152874 A1 | 5/2022 | Dussardier et al. | |
| 2022/0161457 A1 | 5/2022 | Dussardier et al. | |
| 2022/0176591 A1 | 6/2022 | Dussardier et al. | |

FOREIGN PATENT DOCUMENTS

| | | | | |
|---|---|---|---|---|
| CN | 102056722 A | 5/2011 | | |
| CN | 105365066 A | 3/2016 | | |
| CN | 108349114 A | 7/2018 | | |
| DE | 39 20 422 A1 | 1/1991 | | |
| DE | 10 2016 013 785 A1 | 6/2007 | | |
| DE | 10 2007 033 355 A1 | 3/2008 | | |
| EP | 0002131 A1 | 5/1979 | | |
| EP | 0160124 A2 | 11/1985 | | |
| EP | 0775568 A1 | 5/1997 | | |
| EP | 0979714 A1 | 2/2000 | | |
| EP | 0775568 B1 | 5/2000 | | |
| EP | 1543930 A2 * | 6/2005 | ........... | B29C 48/402 |
| EP | 1552914 A1 | 7/2005 | | |
| EP | 3359362 A1 | 8/2018 | | |
| EP | 3359361 B1 | 7/2020 | | |
| FR | 1563077 | 4/1969 | | |
| FR | 2282993 A1 | 3/1976 | | |
| FR | 3001654 A1 | 8/2014 | | |
| FR | 3045173 A1 | 6/2017 | | |
| FR | 3051703 A1 | 12/2017 | | |
| GB | 1125775 A | 8/1968 | | |
| JP | 5-50425 A | 3/1993 | | |
| JP | 2003-144884 A | 5/2003 | | |
| JP | 2006-231582 A | 9/2006 | | |
| JP | 2006-305976 A | 11/2006 | | |
| JP | 2009-12463 A | 1/2009 | | |
| JP | 2010-264606 A | 11/2010 | | |
| JP | 2011-73428 A | 4/2011 | | |
| JP | 2014-172230 A | 9/2014 | | |
| JP | 2015-205402 A | 11/2015 | | |
| WO | 2005/039847 A1 | 5/2005 | | |
| WO | 2009/057753 A1 | 5/2009 | | |
| WO | 2015/190340 A1 | 12/2015 | | |
| WO | 2016/107527 A1 | 7/2016 | | |
| WO | 2017/093854 A1 | 6/2017 | | |
| WO | 2019/162803 A1 | 8/2019 | | |

OTHER PUBLICATIONS

International Search Report dated Apr. 3, 2020, in corresponding PCT/EP2020/054850 (3 pages).
B. Vergnes, et al., "Extrusion-Twin-Screw Extrusion Processes", Materiaux Plastiques et composites, 28 pages (Jan. 2001) with English abstract.
M.J. Crowley, et al., "Pharmaceutical Applications of Hot-Melt Extrusion: Part I." Drug Development and Industrial Pharmacy, vol. 33, No. 9, Marcel Dekker, Jan. 2007, pp. 909-926.

* cited by examiner

MIXING AND EXTRUSION MACHINE WITH SELF-CLEANING TWIN SCREW AND METHOD OF USE

TECHNICAL FIELD

The invention concerns mixers used in the field of rubber mixing. In particular, the invention concerns mixing and extrusion machines that make it possible to produce a variety of rubber mixtures, including sticky and de-cohesive mixtures, without reducing industrial productivity.

BACKGROUND

In the field of producing rubber mixtures, twin-screw extruders already exist, each having a chassis with common assembled parts. The assembled parts may include, without limitation, a sheath screw assembly (with or without its optional heating and cooling accessories), a drive unit (gearbox and coupling), a main motor, devices for supplying material (for example, dosers or hoppers) or for its treatment (for example, degassing devices), a cutting or shaping device for the extruded material, if applicable, a control cabinet that connects the motor drives, start and safety devices, and control, command, display and measurement devices. There are examples of twin-screw extruders described in the publication "Extrusion—Twin-Screw Extrusion Processes" by Bruno Vergnes and Marc Chapet, published on Jan. 10, 2001 by *Techniques de l'Ingénieur, traité Plastiques et Composites* ("the Vergnes/Chapet reference").

The chassis often includes a manual or assisted sleeve opening device, allowing easy access to the screws for cleaning, inspection and/or maintenance. The most commonly used opening system consists of a slide that slides the sleeve relative to the screws (for example, of the type offered commercially by Colmec and Pomini TDE). There are also "portfolio" opening systems, where the sheath is articulated around a lateral hinge (typically known as the Farrel continuous mixer, or "FCM"). The sleeve screw assembly is the active part and ensures the treatment of the material. The sheath is the outer envelope. The sleeve is temperature regulated by the combination of a heating system, generally electric, controlled by temperature control probes, with a cooling system, usually with water circulation. Inside the sleeve, the two rotating screws consume the material and move it forward.

The mixing and screw extrusion machines that are usually used are made up of rotors (that is, the screw(s)) and stators (i. e., the sleeves)). Such a machine is described by the publication WO2005039847 that represents an example of a converging conical twin-screw machine with a movable door that closes the outlet. This type of mixer allows the combination of a mixing phase of the raw materials and an evacuation phase of the mixture thanks to a movable door at the outlet (this movable door being arranged at the end of the screw). The movable door is closed and locked during the mixing cycle, preventing the mixture from exiting the machine. When the mixing cycle is complete, the movable door is unlocked and opens. The rotating screws can then bring forward the product (also called "rubber" or "mixture") contained inside the machine.

This type of mixer mixes and discharges using screws such as Archimedes screws, which are not self-cleaning. When the mixtures become extremely sticky, a lot of product remains adhered on the screw walls. In this case, the product also remains adhered to the sleeves and/or in the introduction hopper, so mixing and evacuation are only partially completed. A lot of product remains adhered on the metal walls of the screws, sleeves or introduction hopper. Even if adjustments of speed, temperature and pressure allow an improvement, they do not facilitate a good repeatability of the mixing or total evacuation of the mixer.

Self-cleaning screws are often used on known twin-screw mixers (for example, of the type shown by the publication JPH0550425). These self-cleaning twin-screw mixers are also known as "continuous mixers". They allow sticky mixtures to be made, but for rubber mixtures, their size and flow rates remain limited. Examples of self-cleaning screws are disclosed by patents EP0160124B1, EP0002131B1, U.S. Pat. Nos. 4,300,839, 4,131,371, and 6,022,133 and by publication WO2016/107527.

The use of mobile sleeves on mixing and extrusion machines is also known. In the past, mobile sleeves have been designed to vary in real time the internal clearances and volumes inside the mixing and extrusion machines having screws and sleeves (see the examples disclosed in publications WO2009057753 and JPH0550425). The product to be extruded or mixed passes through the spaces left by the difference in volume between the screw and the sleeves. These spaces, and more particularly the clearance left between the thread tips of the screw and thread tips of the sleeve (if the sleeve has no threads, the smallest inside diameter is considered), are important for working the product, for its forward speed and for managing any pressure inside the machine. The quality of mixing or extrusion is related to these internal clearances.

The product that is subjected to a very high pressure at the end of the screw will seek to move to areas where the pressure is lower. When the product moves through the machine, it will undergo significant shearing, which will promote the work and homogenization of the product. The use of mobile sleeves allows, from the beginning of the mixing cycle, to have a large air gap and therefore a low pressure drop despite high viscosity. The product can thus be put into cycle from the beginning.

In addition, mobile pressers (or "rams") allow to exert pressure on the mixture during the manufacturing process and thus improve the work of the rubber. Rams are widely used with internal batch mixers such as those of the type Banbury. The U.S. Pat. No. 1,370,398, for example, describes an internal mixer with a ram, and the U.S. Pat. No. 7,404,664 explains an evolution in the shape of a ram to improve mixing. The rams also prevent any retention in the area above the rotors. However, these rams do not allow the complete evacuation of extremely sticky mixtures, which is usually done from below the mixer.

In addition, in a known way, the manufacture of rubber profiles involves the use of extrusion equipment whose function is to produce rubber sheets according to a specific profile. These devices include a body and a screw rotating in the body so that rotating the screw has the effect of extruding the mixture and providing mechanical work to the mixture. On the one hand, the viscosity of the mixture is reduced, and on the other hand, the mixture is propelled towards an extrusion die in order to give a determined profile to the extruded product. The extrusion die is generally formed by a fixed profiled blade and a rotating roller or two rotating rollers rotating in opposite directions (i.e., "a roller nose system"). Examples of roller nose systems are disclosed by patents FR1563077, FR2282993 and FR3001654. An example of a roller nose system used at the outlet of a converging conical twin screw extrusion machine is disclosed by patents JP4294005 and U.S. Pat. No. 8,517,714.

The disclosed invention combines the benefits of converging conical twin-screw mixers with the benefits of self-cleaning screws. The disclosed invention also anticipates ways of achieving these benefits by combining them with the benefits of a variety of tools, including rams, roller nose systems and mobile sleeves. By combining these solutions in variable combinations, improved mixing and total evacuation are achieved reliably and in reduced cycle times, even with particularly sticky and/or de-cohesive mixtures.

SUMMARY

The invention concerns a mixing and extrusion machine for the production of rubber mixtures. The machine includes a converging conical twin-screw mixer with a fixed frame that supports sleeves in which two screws are mounted at an angle between an opening arranged upstream of the sleeves, where an introduction hopper of the machine 10 feeds the screws, and an outlet arranged downstream of the sleeves, where the mixer brings the mixture out at the end of a mixing cycle. The machine also includes one or more motors that rotate the two screws in the sleeves during the mixing cycle, and one or more movable doors provided at the outlet that allow, during the mixing cycle, the evacuation and shaping of a rubber mixture. The two screws are mounted in the mixer so that the thread tips of each screw remain in tangential contact with the surfaces of the opposite screw so that the screws remain substantially in contact with each other when rotating the screws at an angle and at a center distance that facilitates self-cleaning. The contour of an inner surface of the sleeves is predefined to allow a predetermined distance to be determined between each thread and the inner surface of a corresponding sleeve, with the thread tips of the screws remaining in tangential contact with the inner surfaces of the sleeves and preventing the retention of the mixture on these surfaces.

In some embodiments of the machine, the machine also includes a ram having an inner surface with a shape that is complementary to an outer contour of the two screws, the ram moving along the inside of the introduction hopper between a raised position, where the two screws remain accessible for introducing the mixture, and a lowered position, where the inner surface of the ram forms an upper part of the mixer.

In some embodiments, the machine also includes a roller nose system with two counter-rotating rollers arranged just downstream of the outlet to form a sheet of the mixture exiting the mixer.

In some embodiments of the machine, the machine also includes one or more mobile sleeves that are arranged top-down towards the outlet, each mobile sleeve with a support surface with a predetermined surface area according to an elasticity of the mixture. The mobile sleeves include mobile elements that move in a linear movement relative to the outlet in order to adjust a predetermined space between the sleeves and screws. The linear movement is defined between a closed position of the mobile sleeves to facilitate mixing, and an open position of the mobile sleeves to facilitate the flow of the mixture inside the mixer.

In some embodiments of the machine, the screws are selected from interpenetrated and conjugated profiles, including interpenetrated co-rotative profiles with conjugated profiles.

In some embodiments of the machine, the mixer includes an interpenetrated contra-rotating twin-screw mixer, with screws mounted in the sleeves with a movable door at the end that follows the shape of the screws. There are embodiments of the machine in which the screws are symmetrical. There are other embodiments of the machine in which the screws are asymmetrical.

In some embodiments of the machine, the sleeves include cooling channels that manage the temperature of the mixture during the mixing cycle.

In some embodiments of the machine, the movable door includes one or more sliding shutters installed relative to the outlet so that the sliding shutters move linearly between a closed position, in which the sliding shutters prevent the mixer from discharging the mixture, and an open position, in which the sliding shutters are used to prevent the mixture from escaping through the sides of the counter-rotating rollers thereby forcing the mixture to pass between the rollers.

The invention also concerns a mixing process of the type including a step of mixing and extruding a rubber mixture from the disclosed machine. The process includes the following steps:

a step of rotating the screws forward with the movable doors closed;

a step of introducing the mixture into the machine, during which the screws continue to rotate and the movable doors remain closed;

a step of reversing the screws with the movable doors closed, during which the screws rotate in a direction opposite to the direction of rotation during the step of turning the screws forward; and a step of emptying the machine, during which the movable doors open to discharge the mixture from the machine outlet toward a downstream process and in which the screws continue to rotate until the mixer is empty.

In some embodiments of the process, the step of introducing the mixture into the machine includes the introduction of raw materials to form the mixture.

In some embodiments of the process, the step of introducing the mixture to the machine includes the introduction of one or more masterbatches.

In some embodiments of the process, the movable door is open at the end of the mixing cycle, and the mobile sleeves are in the closed position at the end of the mixing cycle.

Other aspects of the invention will become evident through the following detailed description.

BRIEF DESCRIPTION OF THE DRAWINGS

The nature and various advantages of the invention will become more obvious when reading the following detailed description, in conjunction with the attached drawings, in which the same reference numbers refer everywhere to identical elements, and in which.

DETAILED DESCRIPTION

Figure 1:
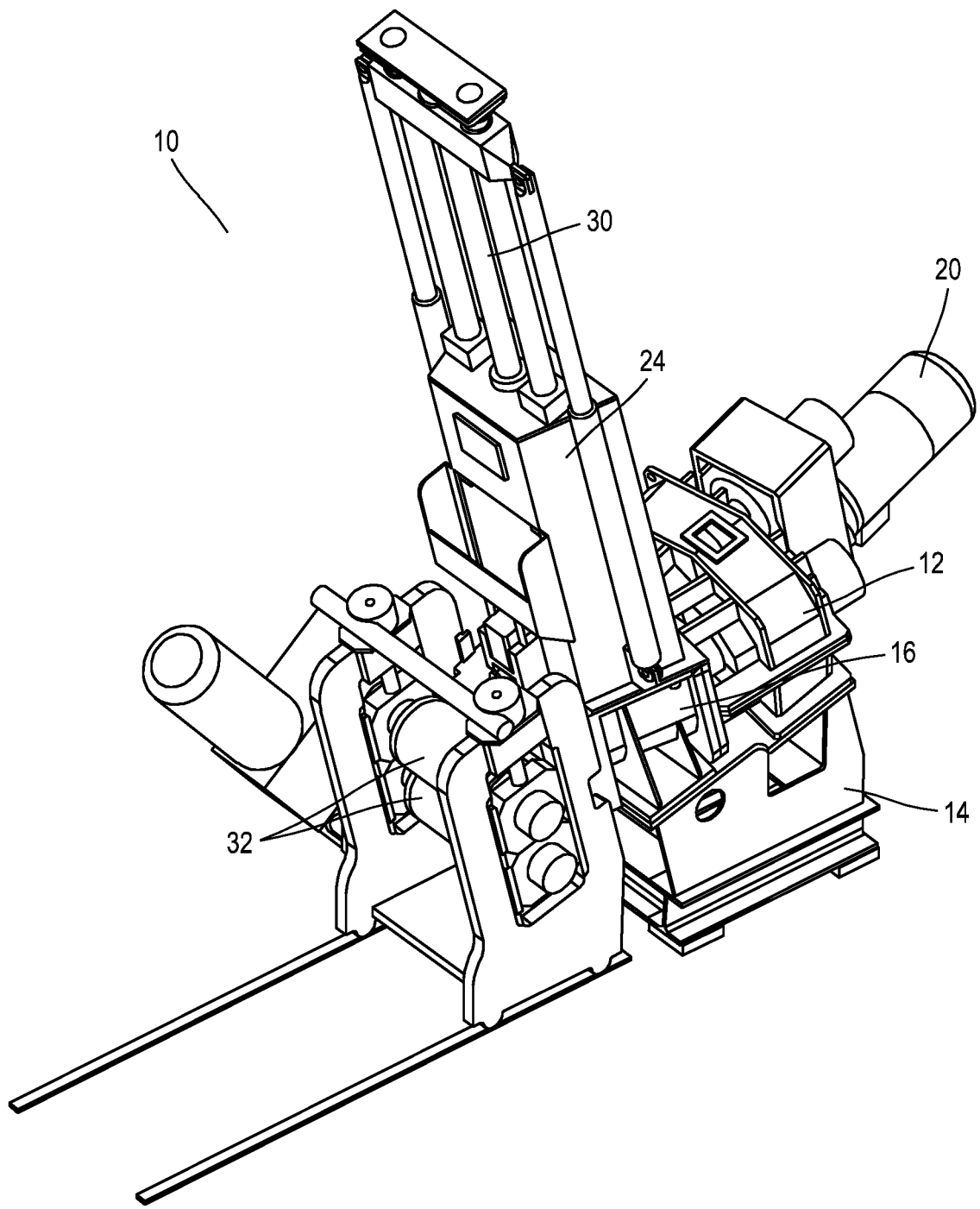
FIG. 1 shows a perspective view of a mixing and extrusion machine of the invention.
Figure 2:
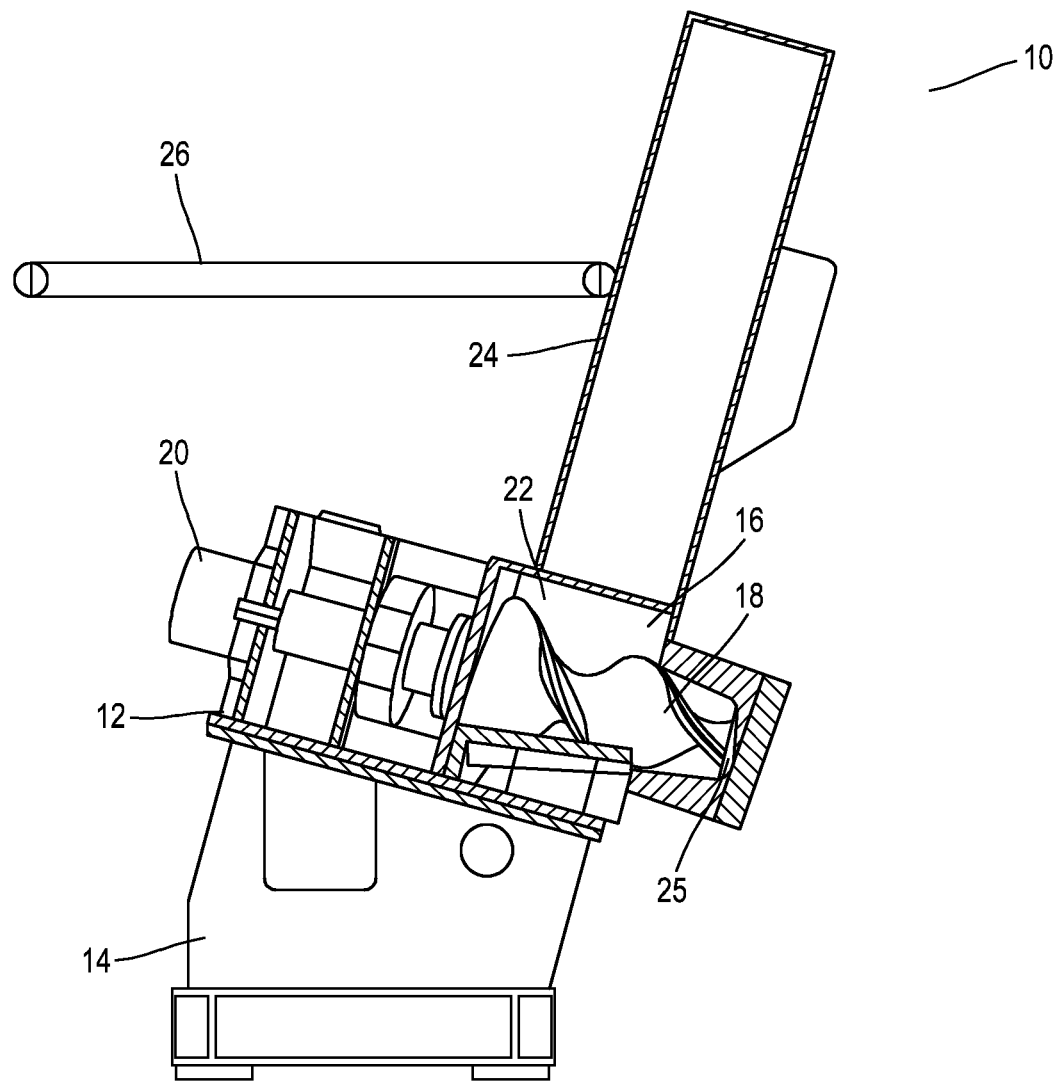
FIG. 2 shows a lateral view, in partial section, of an embodiment of the machine of FIG. 1 with a converging conical twin-screw mixer.

Referring now to the figures, in which the same numbers identify identical elements, FIG. 1 represents an embodiment of a mixing and screw extrusion machine (or "machine") 10 of the invention. The machine 10 includes a converging conical twin-screw mixer (or "mixer") 12 suitable for rubber materials. The mixer 12 includes a fixed frame 14 that supports fixed sleeves (or "sleeves") 16 in which the two screws 18 are mounted. One or more motors 20 rotate the two screws in the sleeves 16 during a mixing cycle. An upper surface of the fixed frame 14 includes guides (not shown) on which the sleeves 16 (without the screws 18) are able to move in translational movement. The mixer 12 is chosen from commercially available mixers, including those of the type disclosed by U.S. Pat. No. 7,556,419 and proposed by Colmec S.p.A.

Figure 3:
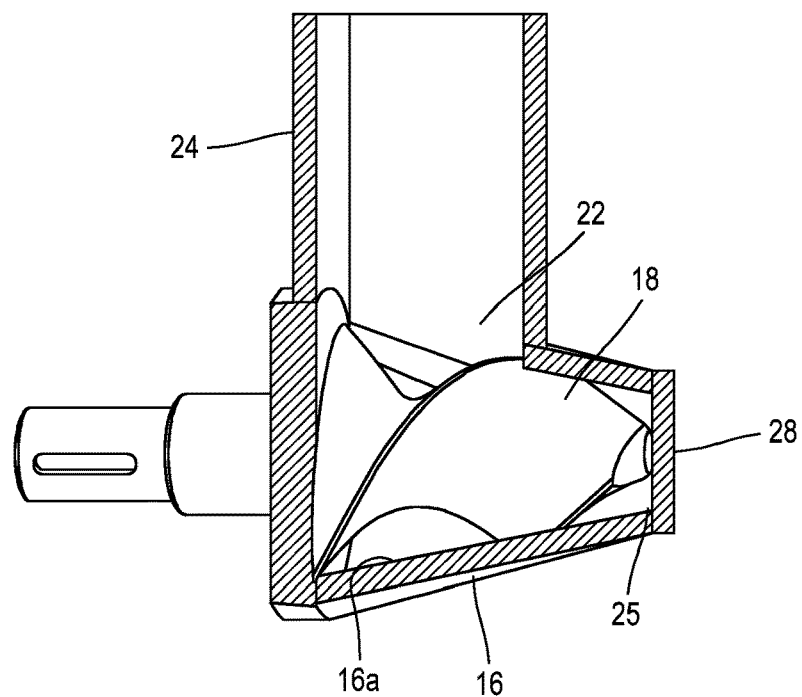
FIG. 3 shows a partial cross-sectional lateral view of a screw from the mixer of FIG. 2 mounted in mixer sleeves.
Figure 4:
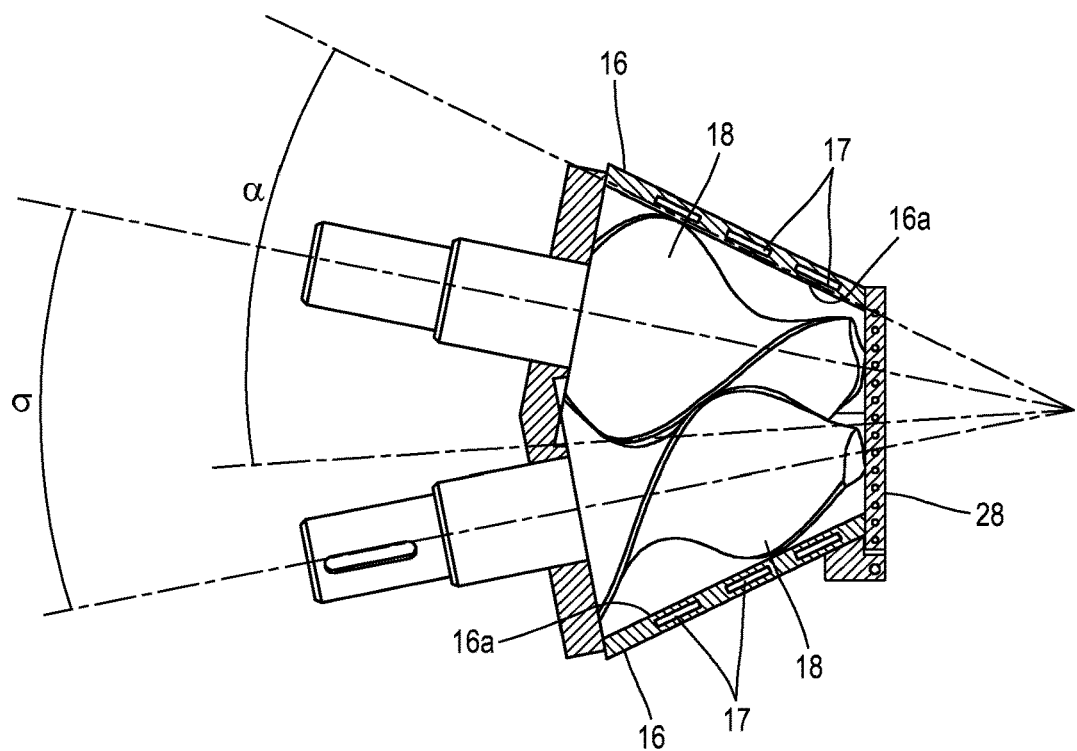
FIG. 4 shows a top view of the screws of FIG. 3 mounted in the mixer with a closed movable door.
Figure 5:
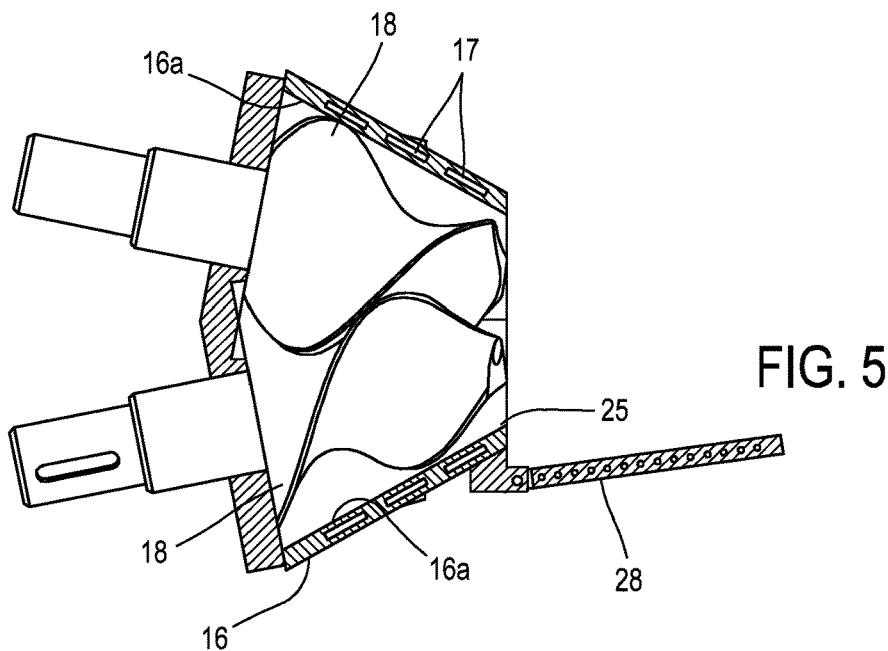
FIG. 5 shows a corresponding view with the movable door open.

Referring further to FIG. 1 and also to FIGS. 2 to 5 (which represent an embodiment of the machine of FIG. 1), the screws 18 are mounted in the sleeves 16 at an angle between an opening 22 arranged upstream of the sleeves (where an introduction hopper 24 of the machine 10 feeds the screws 18), and an outlet 25 arranged downstream of the sleeves (where the mixer 12 discharges the mixture at the end of the mixing cycle). The sleeves 16 can include known cooling channels for managing the temperature of the mixture. A mode of realization of the cooling channels is represented in FIGS. 4 and 5 by the channels 17, but it is understood that equivalent configurations can be substituted therefor.

The machine 10 can include an optional conveyor known to the skilled person (for example, the belt 26 shown in FIG. 2) for use in introducing components through the introduction hopper 24. These components can be all types of components necessary for the manufacture of rubber products.

Referring further to FIGS. 1 to 5, at least one movable door 28 is provided at the outlet 25 of sleeves 16 that closes the outlet during the mixing cycle (see FIGS. 3 and 4). The movable door 28 is opened at the end of the mixing cycle (see FIG. 5) in order to allow the rubber mixture to be evacuated and shaped. As used here, the terms "movable door" and "movable doors" are interchangeable.

In an embodiment of the machine 10 shown in FIGS. 3 to 5, the two screws 18 are mounted in the mixer 12 so that the thread tips of each screw contact tangentially the surfaces of the opposite screw. In other words, the screws are in substantial contact with each other at an angle and at a center distance that facilitates self-cleaning. The screws are said to be "substantially in contact" when the screws can be cleaned by friction, or when the two screws face each other with such a small gap between them that an extruded material cannot remain attached to the surfaces of the screws. The screws are said to rub against each other, or to be "self-cleaning", when the materials transported in the channel of one of the screws cannot remain in that channel for more than one revolution of the screw. As a result, the material undergoes much more movement in the downstream direction, parallel to the screw axis, than in a lateral direction, perpendicular to the axis.

The two screws 18 are assembled in the mixer 12 with the axes of the two screws in the same plane and with the tops of the threads inscribed in a predefined cone in which an acute angle σ is predefined. The axes are separated by an acute angle α that will leave very little clearance between the surfaces of the screws 18 and between the thread tips of the screws and the sleeves 16 of the machine 10. The clearance will depend on the size of the machine 10 but will not exceed a few millimeters. During the rotation of the screws 18, the thread tips of each screw, being substantially in contact during the duration of the mixing cycle, remain in tangential contact with the surfaces of the flanks of the opposite screw. Thus, no product can remain stuck on a screw surface without being pushed by a rotating screw thread.

In this embodiment of the screws 18, the screws are chosen from interpenetrated and conjugated profiles, and particularly from interpenetrating co-rotating profiles with conjugated profiles (which are known for their self-cleaning nature). Different screw profiles are known to be self-cleaning when the screws are used in twin-screw mixers. With respect to the direction of rotation, the screws are said to be co-rotating if they rotate in the same direction and counter-rotating if they rotate in opposite directions from one another. With respect to interpenetration, the screws are said to be interpenetrated when the thread of one screw penetrates more or less deeply into the channel of the neighboring screw (the screw being either partially or fully interpenetrated). Otherwise, the screws are said to be non-interpenetrated or tangent. It is understood that the flow conditions are implicated by conjugated or non-conjugated profiles, parallel or conical screws, single-threaded or multi-threaded profiles, and modular or non-modular screws.

The contour of an inner surface 16a of the sleeves 16 is predefined, which allows the determination of a distance between each thread and the inner surface of a corresponding sheath, and thus the shear rate on the inner surface of the sleeves. Similarly, the thread tips of the screws contact tangentially the inner surfaces of the sleeves, preventing any retention of mixing material on these surfaces.

Figure 6:
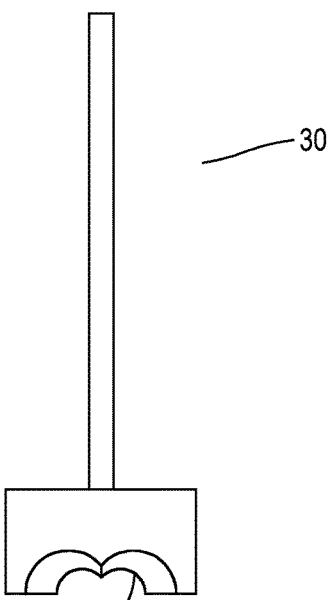
FIG. 6 shows a front view of a ram of an embodiment of the machine of the invention.
Figure 7:
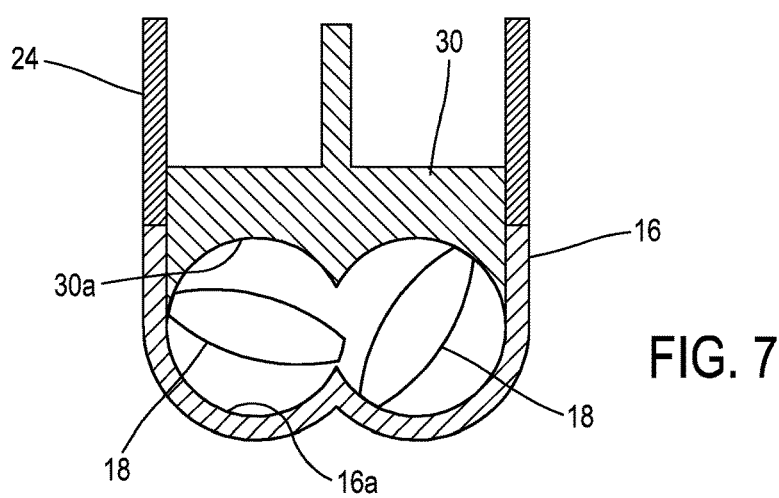
FIG. 7 shows a partial cross-sectional lateral view of the ram of FIG. 6 in a lowered position relative to the mixer.

Referring further to FIGS. 6 and 7, another embodiment of the machine 10 includes the two screws 18 and a ram 30 that moves inside the introduction hopper 24. The ram 30 is similar to the rams used in mixing processes performed by Banbury type internal mixers.

As with internal mixers, the ram 30 presses the mixture and thus allows the transmission of more energy and shear to the mixture (see, for example, U.S. Pat. No. 7,404,664 cited above). An inner surface 30a of the ram 30 has a shape that is complementary to an outer contour of the two screws 18. Guidance of the ram 30 is effected between a raised position (shown in FIG. 2), where the two screws 18 remain accessible to introduce the mixture, and a lowered position (see FIG. 7), where the inner surface 30a of the ram 30 forms an upper part of the mixer 12. The guidance of the ram 30 is done by sliding systems as known on Banbury rams (animated, for example, by cylinders that can be pneumatic, hydraulic or their equivalents). Thus, in its lowered position, the ram 30 leaves only a very small clearance between the thread tips of the screws 18 and its inner surface 30a. In this position, there are no more internal surfaces that are not "cleaned" by the movements of the screws. In addition, there are no more dead zones in the machine 10. When the movable door 28 opens to discharge the mixture, no product retention is possible, and the entire mixture will be evacuated by the movement of the screws 18.

Referring again to FIG. 7 (the two screws being shown in schematic form), the ram 30 presses the mixture, allowing the transmission of more energy and shear to the mixture. The ram 30 also serves to clean the surfaces of the hopper 24 during its downward movement, removing the pieces of rubber that could stick to it. At the same time, the ram 30 also serves to improve the ingestion of the mixture when it arrives as a "masterbatch" from an upstream machine (the qualities of a "masterbatch" are described below). The ram 30 forces the mixture to pass quickly between the screws 18 and thus prevent it from remaining in block form above the screws.

Figure 8:
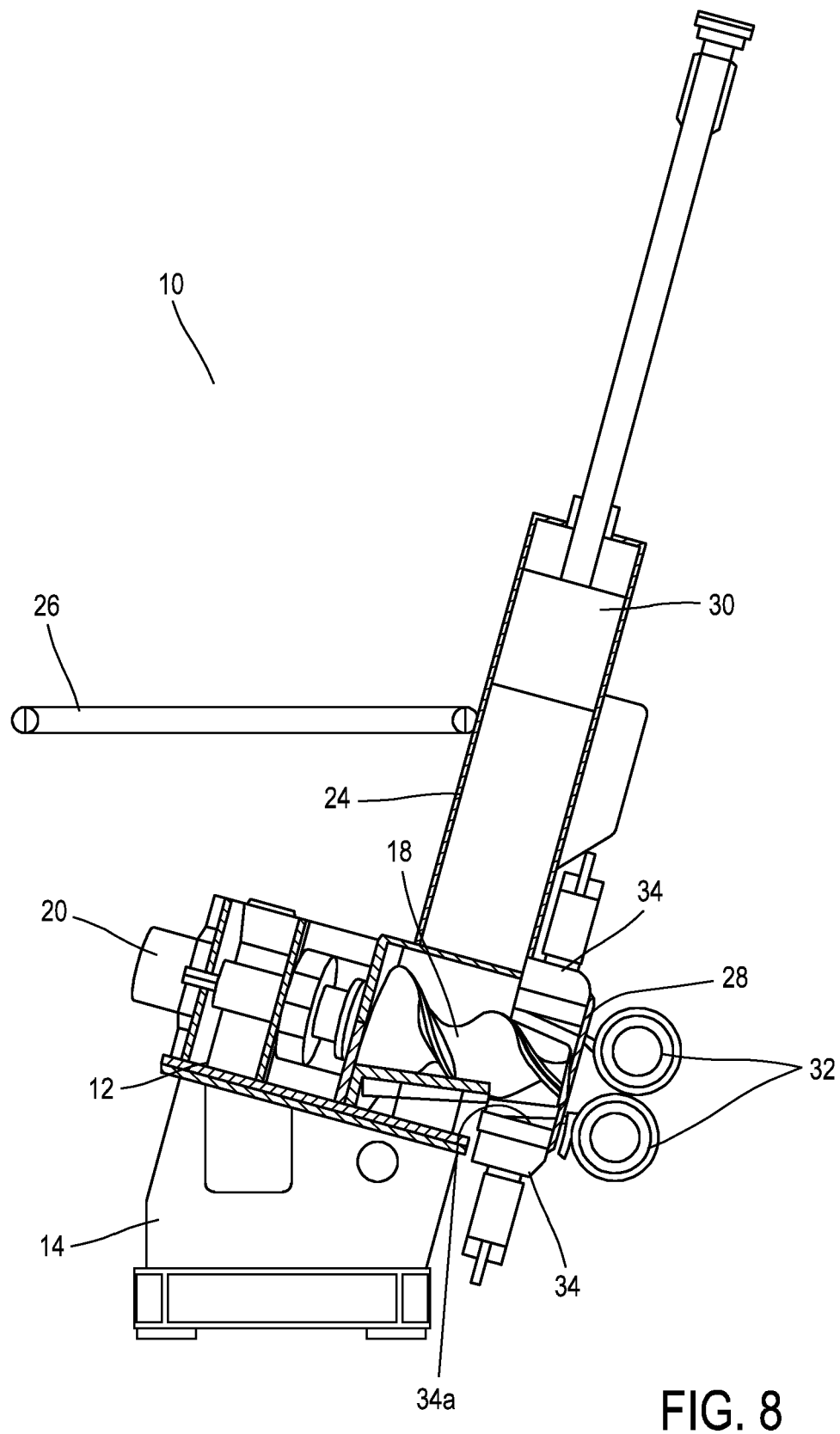
FIG. 8 represents a lateral view, in partial section, of an embodiment of the machine of the invention having the ram of FIGS. 6 and 7 and at least one of a roller nose type system and one or more mobile sleeves arranged towards an outlet of the mixer.

Referring further to FIG. 8 (wherein the same numerals identify the same elements), an embodiment of the machine 10 may include a roller nose system. A roller nose type system includes two counter-rotating rollers 32 disposed just downstream of the outlet 25 to form a sheet of the mixture discharged from the mixer 12 (the rollers 32 are also shown in FIG. 1). The roller nose type system may also include optional control means (not shown) for controlling the feed rate of the mixture to the rollers. The rotation of the rollers 32 is controlled by the amount of the mixture discharged by the mixer 12 (detected, for example, by a proximity sensor, by a pressure sensor or by an equivalent device).

Referring to the embodiments of the machine shown heretofore, the screws 18 are selected from interpenetrated and conjugate profiles, and particularly from interpenetrating co-rotative profiles with conjugate profiles (which are known for their self-cleaning nature). It is understood that there are several embodiments of the screws 18, including without limitation, of type one, two or three threads, or double-threaded conjugate type. The screws can be selected from screws with one thread or from screws with two, three or four threads. The interpenetrating contra-rotative profiles are also known for their assembly and their use in the mixer 12. The invention applies these types of screws and their equivalents to the mixer 12 of the machine 10 according to the chosen rubber mixture recipe and its desired properties.

Figure 9:
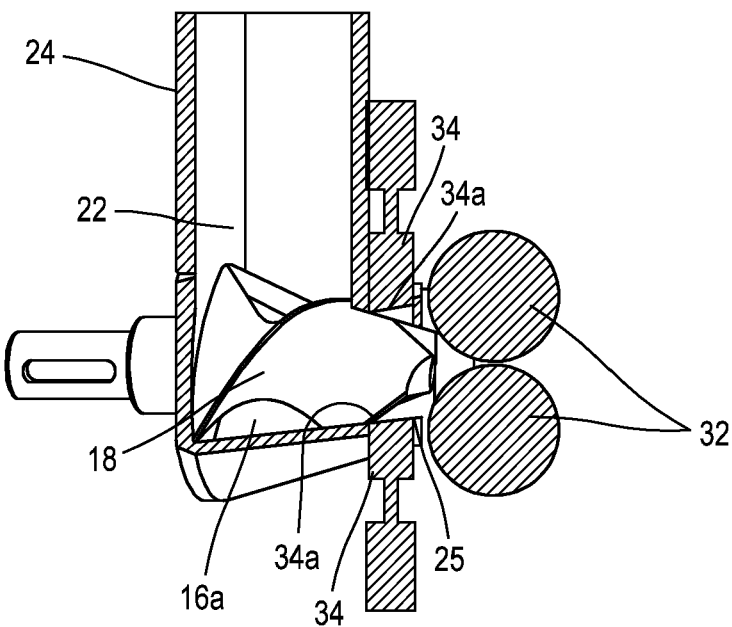
FIG. 9 shows a lateral view, in partial section, of a screw of the mixer of FIG. 8, including mobile sleeves.

Referring again to FIGS. 1 to 8, and also to FIG. 9, another embodiment of the machine 10 associates the benefits of the screws 18, the ram 30 and the counter-rotating rollers 32 with one or more mobile sleeves such as the mobile sleeves 34 shown in FIGS. 8 and 9. The mobile sleeves 34 are arranged top-down towards the outlet 25. It is understood that other embodiments of the mobile sleeves can be used (for example, left-right and angled modes). The mobile sleeves 34 include mobile elements for adjusting a predetermined space between the sleeves 16 and the screws 18. Each mobile sleeve has a support surface 34a with a predetermined surface area according to an elasticity of the mixture. It is understood that the mobile sleeves having support surfaces with different surface may be interchangeable to ensure the use of the machine without having to replace it.

The embodiment shown has two mobile sleeves 34, but it is understood that only one mobile sleeve (or another equivalent element) or several mobile sleeves (or other equivalent elements) can be integrated (for example, into top-bottom mode, left-right mode, or angled mode). The mobile sleeves 34 adjust the space between the sleeves and the screws to promote the flow of the mixture inside the mixer 12, thus adjusting the duration and degree of mixing of the mixture.

Referring again to FIGS. 8 and 9, the two screws 18 circulate the mixture from an upstream side (next to the introduction hopper 24) to a downstream side where the mobile sleeves 34 of the machine 10 are installed. The mobile sleeves 34 are installed relative to the outlet 25 of the mixer 12 so that, in an open position, they allow the flow of the mixture to the rollers 32 of the roller nose type system. The mobile sleeves can move alternately or randomly to reduce the space between the screws and the bearing surface in a random manner, thus creating downstream-upstream flow of the mixture and preferably above or below). For example, in one way of using the machine 10, the mobile sleeves 34 are mostly in the open position at the beginning of the mixing cycle when the mixture has a high viscosity (to promote the flow of mixture), and they are mostly in the closed position at the end of the mixing cycle when the mixture has a lower viscosity (to promote mixing). Guidance of the mobile sleeves 34 is effected by known systems (animated, for example, by cylinders that can be pneumatic, hydraulic or their equivalents). The linear movement of the moving sleeves 34 is controlled by the amount of the mixture discharged by the mixer 12 (detected, for example, by a proximity sensor, by a pressure sensor or by an equivalent device).

Figure 10:
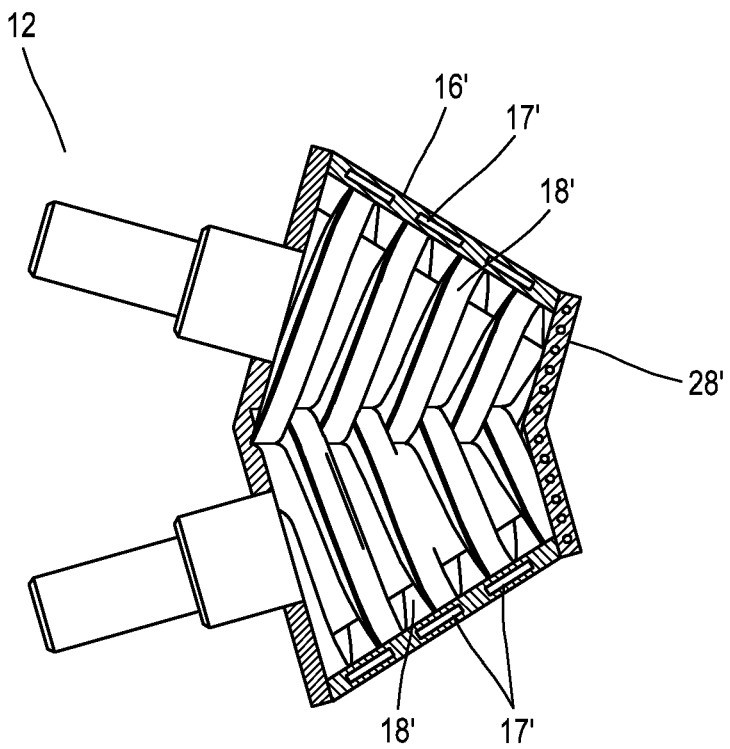
FIG. 10 shows a top view of an embodiment of the mixer with self-cleaning, interpenetrating counter-rotating twin screws, the screws being symmetrical.
Figure 11:
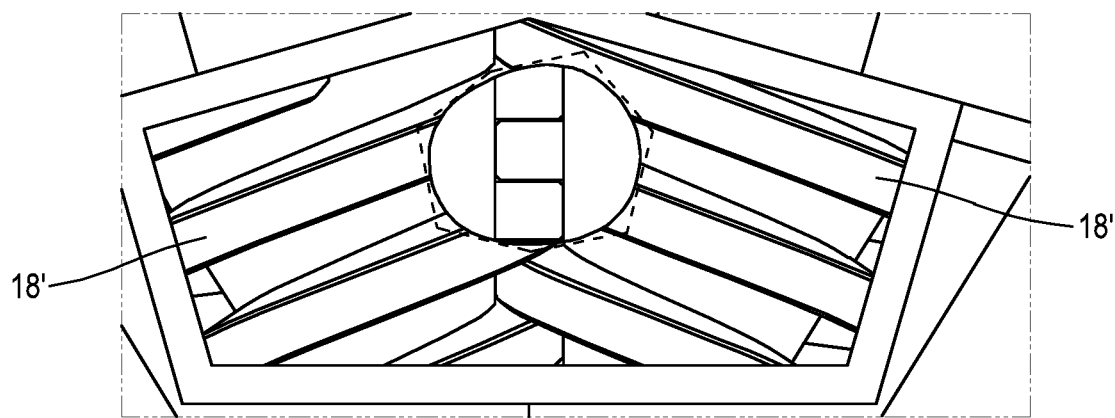
FIG. 11 shows an expanded schematic view of the clearances between the threads of the screws of FIG. 10.
Figure 12:
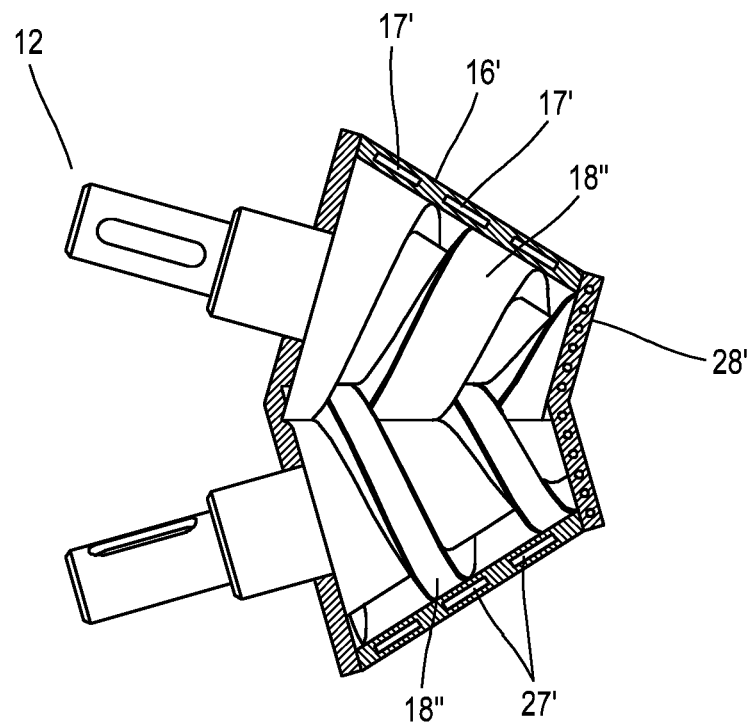
FIG. 12 shows a top view of an embodiment of the mixer with self-cleaning, interpenetrating counter-rotating twin screws, the screws being asymmetric.

Referring further to FIGS. 10 to 13, these figures show embodiments of the mixer 12, these being self-cleaning contra-rotating twin-screw embodiments. For each embodiment, the screws are mounted in the sleeves 16' with a movable outlet door 28' that follows the shape of the screws. In FIGS. 10 and 11, the two screws 18' are symmetrical in order to remove the dead zones in the machine 10 during the mixing cycle. FIG. 11 particularly shows the minimal gaps left between the threads of the screws 18', which remain substantially in contact. In FIG. 12, the two screws 18" are asymmetrical in order to liberate larger spaces that will promote the flow of mixture. For each embodiment, the sleeves 16' may include known cooling channels (represented by the channels 17') for managing the temperature of the mixture.

Figure 13:
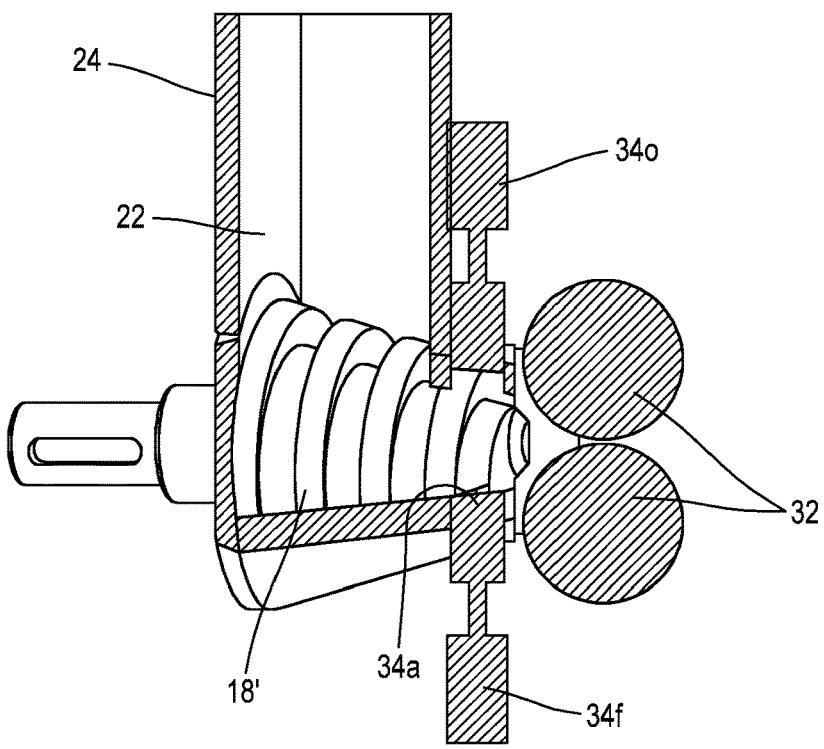
FIG. 13 shows a lateral view, in partial section, of an embodiment of the machine using the symmetrical screws in FIG. 10 together with rollers and mobile sleeves.

It is understood that these embodiments of the screws are likely to be incorporated into different embodiments of the machine 10. For example, FIG. 13 shows an embodiment of the machine 10 in which the symmetrical screws 18' are used together with the rollers 32 and the mobile sleeves 34 (the mobile sleeves being in a partially closed state with a mobile sleeve $34_f$ remaining in a closed position and the other mobile sleeve $34_o$ taking an open position). It is understood that the asymmetrical screws 18" may be substituted by the symmetrical screws 18' depending on the recipe of the selected mixture without changing the operation of the machine 10.

Figure 14:
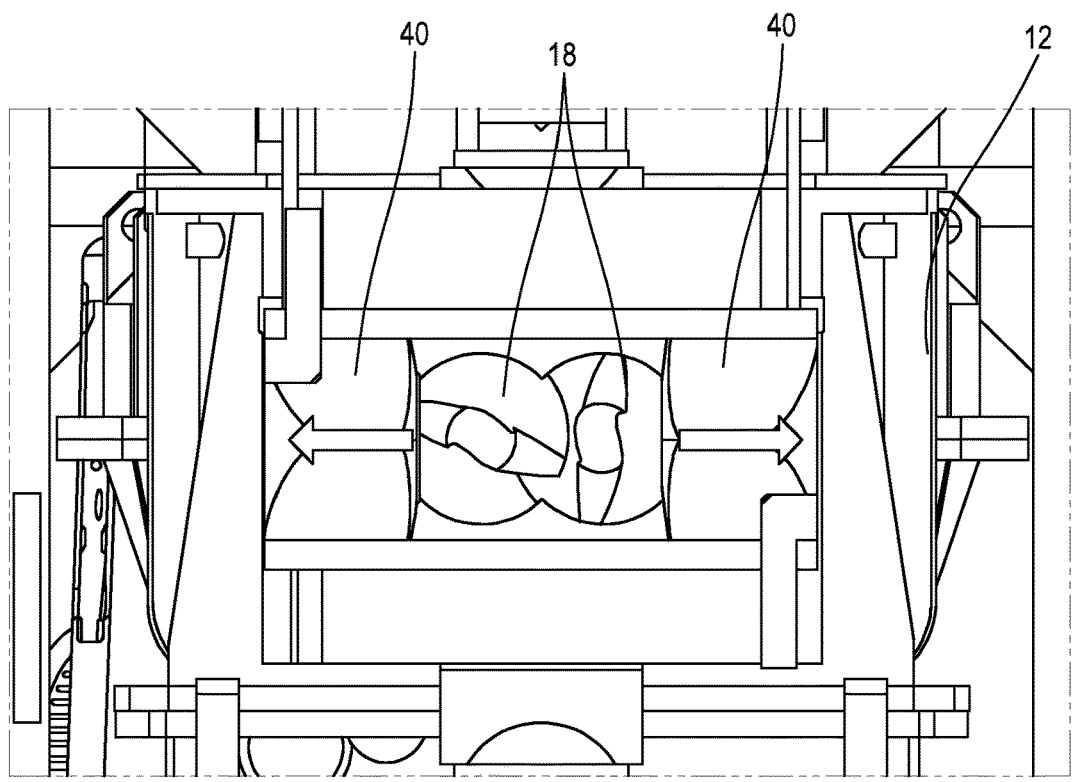
FIGS. 14 to 16 represent steps in an exemplary cycle of a mixing process of the invention.

In this embodiment of the machine 10, the movable doors can be sliding shutters 40 as shown in FIG. 14. The sliding shutters 40 are interposed between the rollers 32 and a front face of the mobile sleeves 34 of the machine 10. The sliding shutters 40 include movable elements for regulating the flow of the mixture exiting the mixer 12. The sliding shutters 40 are installed relative to the outlet 25 of the mixer 12 so that, in a closed position (not shown), they prevent the discharge of the mixture from the mixer 12 (for example, to promote mixing when the mixture has a lower viscosity). In an open position (shown in FIG. 14), the sliding shutters serve as "ears" to the rollers 32 that prevent the mixture from escaping through the sides of the rollers 32. Thus, the mixture is forced to pass between the two rollers and will be calendered in the form of a thin sheet of a predefined width by the opening of the sliding shutters.

Referring again to FIGS. 14 to 16, a detailed description is given by way of example of a cycle of a mixing process of the invention. It is understood that the process can easily be adapted for all embodiments of the machine 10.

In launching a cycle of the mixing process of the invention, the mixing process includes a step of rotating the screws 18 in the forward direction (see arrow A of FIG. 15) with the movable doors 28 closed. During this step, the rotating screws cause the product to move downstream of the mixer as soon as the mixture (or raw materials) is introduced into the machine 10. In all embodiments of the machine 10, the speed of rotation can be variable during the cycle. When the screws 18 are interpenetrated, the speed of rotation of the two screws is synchronized.

Figure 15:
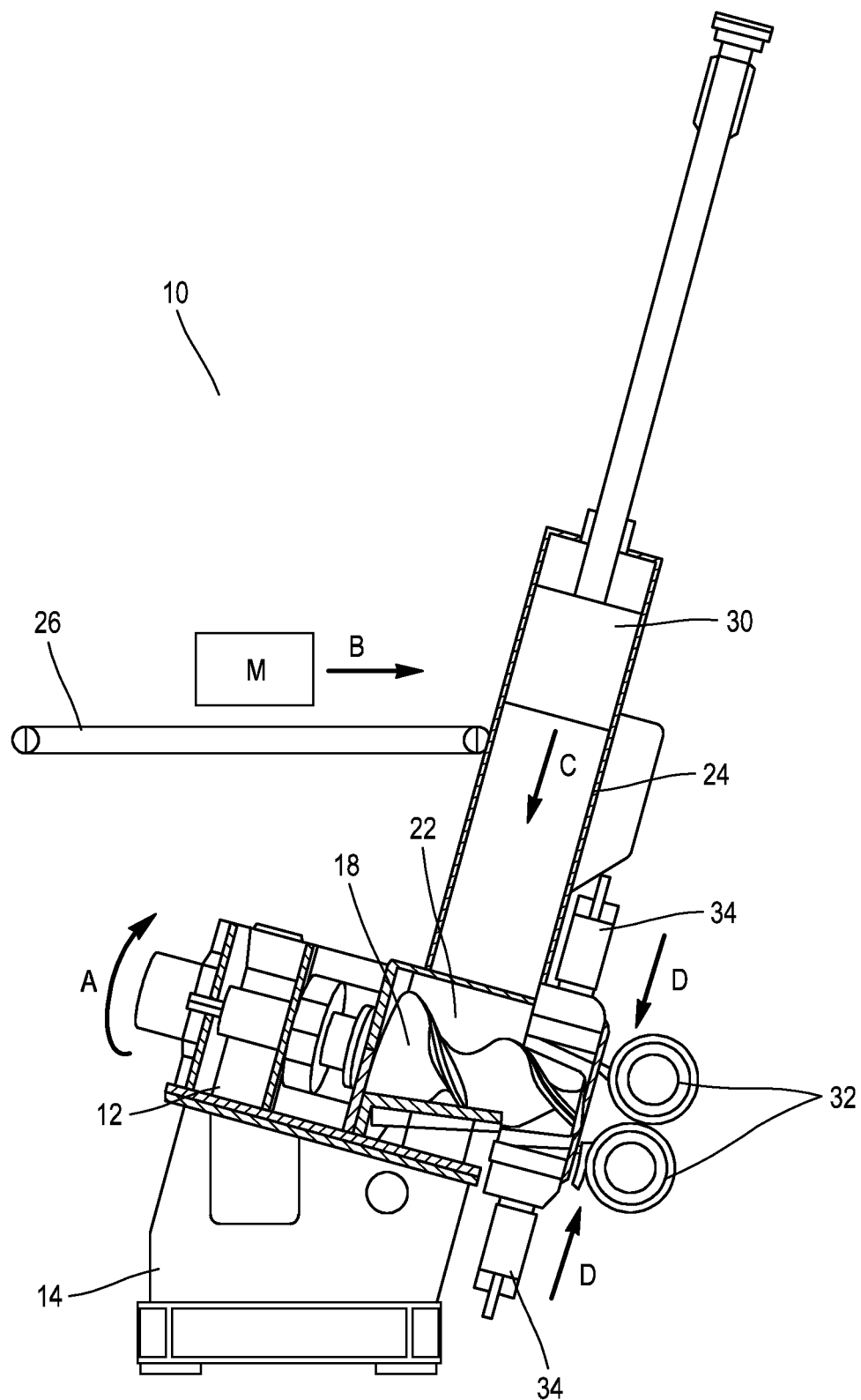

The mixing process includes a step of introducing a mixture M into the machine 10 (shown by the arrow B of FIG. 15 as being conveyed by the belt 26). During this step, the screws 18 continue to rotate and the movable doors 28 remain closed. In the embodiments of the machine 10 having a ram 30, the ram remains in its raised position during this step. In the embodiments of the machine 10 also having the rollers 32, the rollers remain on standby during this step. In the embodiments of the machine 10 further having the mobile sleeves 34, the mobile sleeves remain in their open position (i.e., with maximum space between the sleeves and the screws) during this step.

During the step of introducing the mixture into the machine 10, the cycle of the mixing process can be started by introducing, into the empty machine, the different raw materials necessary for producing the product, including, without limitation, a material elastomer (for example, a natural rubber, a synthetic elastomer and combinations and equivalents thereof) and one or more ingredients, such as one or more processing agents, protecting agents and reinforcing fillers. The raw materials may also include one or more other ingredients such as carbon black, silica, oils, resins, and crosslinking or vulcanizing agents. All ingredients are introduced in varying amounts depending on the desired performance of the products obtained from the mixing processes (for example, tires).

The mixing cycle can also be done by starting the cycle with a product already mixed but not containing all the ingredients of the recipe (called "masterbatch"). For example, resins and vulcanizing agents are not present in the masterbatch. These ingredients, which make mixing difficult (especially for stickiness or decohesion problems), can be added to the mixer 12 to complete the mixing. In this case, either the masterbatch is recovered hot from an upstream mixer (such as an internal mixer or an external mixer), or the masterbatch is cold because it was manufactured and conditioned several hours or several days beforehand.

During the step of introducing the mixture into the machine 10, the belt 26 (or other equivalent means) serves to successively introduce the raw materials and other necessary ingredients according to a predetermined recipe. In one embodiment, elastomeric material is introduced into the machine 10, followed by the introduction of reinforcing fillers such as carbon black or silica, oils, resins and vulcanizing agents.

In the embodiments of the machine 10 having a ram 30, the mixing process includes a step of lowering the ram that is carried out after the step of introducing the mixture M into the machine 10 (see arrow C of FIG. 15). The screws 18 continue to rotate during this step. In the embodiments of the machine 10 also having the rollers 32, the rollers remain on standby during this step.

In the embodiments of the machine 10 further having the mobile sleeves 34, the mixing process includes a step of partially closing the mobile sleeves 34 (either the two mobile elements simultaneously or the two mobile elements alternately) (see the arrows D of FIG. 15). The partial closing of the mobile sleeves may refer to their reciprocating movement (see the example shown in FIG. 13) or to their simultaneous movement. During this step, the screws continue to turn, and the ram stays lowered.

Figure 16:
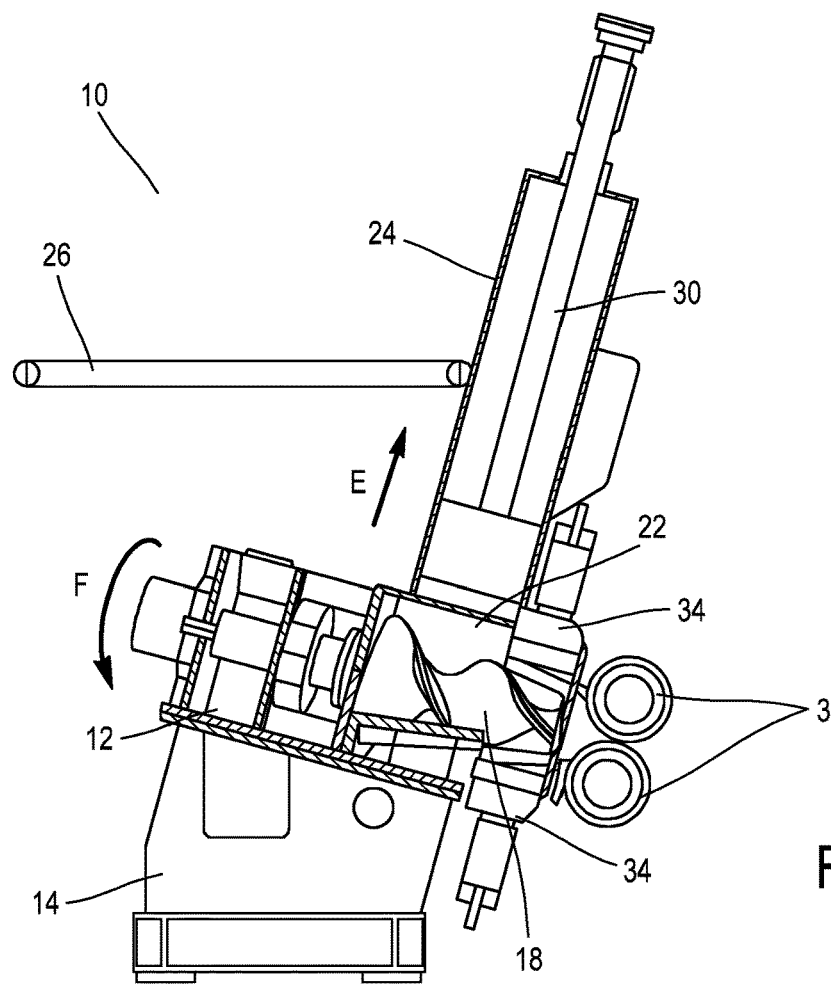

In the embodiments of the machine 10 having the ram 30, the mixing process includes a step of raising the ram (see arrow E of FIG. 16). In the embodiments of the machine 10 having the rollers 32, the two rollers remain on standby during this step. In embodiments of the machine 10 further having the mobile sleeves 34, the mobile sleeves are in a partially closed position during this step. For each embodiment of the machine 10, the screws continue to rotate during this step.

The mixing process includes a step of reversing the rotation of the screws 18 (see arrow F of FIG. 16) with the movable doors 28 closed. During this step, the screws rotate in the opposite direction with respect to the step of rotating the screws in the forward direction. The entire mixture located in the machine 10 has a downstream-upstream movement that will cause additional distribution of raw materials. In the embodiments of the machine 10 having the ram, the ram remains raised during this step. In the embodiments of the machine 10 having the rollers 32, the two rollers remain on standby during this step. In the embodiments of the machine 10 further having the mobile sleeves 34, the mobile sleeves remain partially closed during this step.

The mixing process further includes a step of rotating the screws forward (as represented by the arrow A of FIG. 15) with the movable doors 28 closed. During this step, the screws turn in the opposite direction with respect to the step of rotating the screws in reverse. In the embodiments of the machine 10 having the ram 30, the ram remains raised during this step. In the embodiments of the machine 10 having the rollers 32, the two rollers remain on standby during this step. In the embodiments of the machine 10 further having the mobile sleeves 34, the mobile sleeves remain partially closed during this step.

In the embodiments of the machine 10 having a ram 30, the mixing process includes a step of lowering the ram (as represented by the arrow C of FIG. 15) carried out after the preceding step of rotating the screws 18 forward. The screws continue to rotate during this step. In the embodiments of the machine 10 also having the rollers 32, the rollers remain on standby during this step. In the embodiments of the machine 10 further having the mobile sleeves 34, the mobile sleeves remain partially closed during this step.

Figure 17:
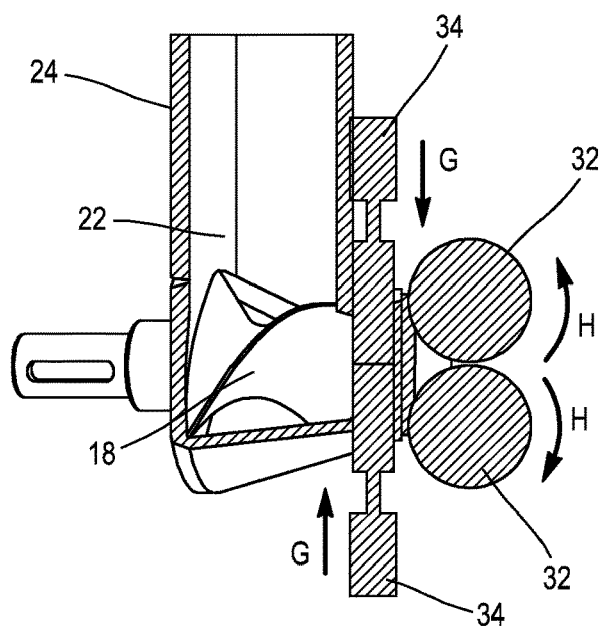

In the embodiments of the machine 10 further having the mobile sleeves 34, the mixing process includes a step of completely closing the sleeves, thus eliminating the space between the sleeves 16 and the screws 18 (see the arrows G of the FIG. 17). This step includes either the simultaneous closing or the alternating closing of the two mobile elements. During this step, the ram 30 is again raised (as represented by the arrow E of FIG. 16). During this step, the screws 18 continue to rotate and the rollers 32 remain on standby. The mixing process includes a final step of emptying the machine 10.

During this step, the movable doors 28 open to discharge the mixture from the machine outlet 25 toward a downstream process (see FIG. 5 that shows the mixer 12 with the movable door 28 open). In the embodiments of the machine 10 where the movable doors include two or more movable elements, this step includes either the simultaneous opening or the alternative opening of the movable elements. In the embodiments of the machine 10 having the ram 30, the ram is lowered during this step. In the embodiments of the machine 10 also having the rollers 32, this step further includes the step of rotating the rollers (see arrows H of FIG. 17) to allow the mixture to be discharged in the form of sheets. In the embodiments of the machine 10 further including the mobile sleeves 34, the mobile sleeves remain completely closed, but they can be adjusted according to a volume of the mixture exiting the mixer. In each embodiment of the machine 10, the screws 18 continue to rotate during this step in order to completely empty the machine 10.

At the end of the mixing cycle, the product is finished mixing and can be used in a downstream process (which may be, for example, a palletizing process, a shaping process, and/or another mixing process and/or extrusion process). After the end of the step of emptying the machine 10, the cycle of the mixing process can restart. It is understood that certain stages of the cycle, as well as the cycle itself, can be performed in an iterative manner depending on the chosen mixing recipe. Owing to the self-cleaning performed by the screws 18, all types of mixtures, including sticky mixtures and cohesive mixtures, are thus completely removed from the machine.

It is contemplated that the machine 10 may perform one or more processes relating to the plasticization of natural elastomers.

A cycle of the mixing process of the invention may be realized by PLC control and may include pre-programming of the control information. For example, a process control may be associated with the mixture that is provided to the mixer 12, including the properties of the screws 18, the properties of the mixture entering the hopper 24, and the properties of the mixture discharged from the mixer.

For all embodiments, a monitoring system may be put in place. At least a portion of the monitoring system may be provided in a portable device such as a mobile network device (for example, a mobile phone, a laptop, a portable device or devices connected to the network, including "augmented reality" and/or "virtual reality" devices, portable clothing connected to the network and/or any combination and/or all equivalents thereof).

In some embodiments of the invention, the machine 10 (and/or a system that incorporates the machine 10) may receive voice commands or other audio data representing, for example, a start or stop of rotation of the screws 18. The request may include a request for the current state of a mixing process cycle. A generated response can be represented in an audible, visual, tactile (for example, using a haptic interface) and/or virtual or augmented manner.

In an embodiment, the process can include a step of training the machine 10 (or a system that incorporates the machine 10) to recognize values representative of the mixture exiting the mixer 12 (for example, temperature and viscosity values) and to make a comparison with target values. This step can include the step of training the machine to recognize non-equivalence between the compared values.

Each step of the training can include a classification generated by self-learning means. This classification may include, without limitation, the parameters of the raw materials and masterbatches of the chosen mixing recipe, the configurations of the self-cleaning screws, the duration of the mixing cycles and the values expected at the end of a mixing cycle in progress (for example, the value of the space between the sleeves and the screws during the current mixing cycle when the sleeves are partially closed, etc.).

The machine 10 is suitable for processing a variety of rubber mixtures, including sticky mixtures and de-cohesive blends, without decreasing industrial productivity.

The term "de-cohesive" refers to a mixture that, in an industrial use of a shaping process, has a raw strength that is less than the forces of forced elongations. This has the consequence of tearing the material and generating industrial difficulties (for example, loss of material, lower mixing efficiency, and irregular supply of the machines following sheet tearing). Factors that influence the de-cohesion level include, without limitation, the characteristic of the polymer (for example, chemistry (SBR, IR, BR, NR), functionalization, macrostructure and microstructure), the characteristic of the mixture (for example, the volume fraction of filler and plasticizer and the rate of implementing agents), and the existence of a balance between the adhesion of the mixture to the tools of implementation and their energy of internal cohesion.

The term "sticky" defines a property of a rubber blend that varies according to the formulations of the mixtures. Below are described the formulation parameters influencing the stickiness of mixtures on industrial processes.

EXAMPLE

In considering the level of stickiness of the mixtures in the manufacturing plants, the properties of a composition of the mixtures influence this level, in particular:

The ratio of the reinforcing filler content and the plasticizer ratio, this ratio indicating a stickier mixture as a function of lowering the ratio.

The ratio of resin in the mixture, this ratio indicating a stickier mixture as a function of ratio increase.

The volume fraction of elastomer that indicates a stickier mixture as a function of lowering volume fraction.

The characteristic of the elastomer that can be included in the stickiness component of the mixtures is also considered. In this example, a Mooney ML1+4 100° C. of dry elastomer <50 points, or the presence of isoprene is considered. Mooney, also known as viscosity or plasticity, characterizes, in a known manner, solid substances. An oscillatory consistometer as described in ASTM standard D1646 (1999) is used. This measurement of plasticity is carried out according to the following principle: the sample analyzed in the raw state (i.e., before curing) is molded (formed) in a cylindrical chamber heated to a given temperature (for example 35° C. or 100° C.). After one minute of preheating, the rotor rotates within the specimen at 2 rpm and the torque needed to maintain this movement is measured for 4 minutes of rotation. The Mooney viscosity (ML 1+4) is expressed in "Mooney unit" (with 1 UM=0.83 Nm) and corresponds to the value obtained at the end of the 4 minutes A very sticky mixture is not necessarily an "extreme" mixture on one of the criteria, but it is the combination of all the criteria that gives its stickiness and therefore its difficulty of realization. By multiplying these criteria, a "stickiness index" is thus found and represented by the table below:

TABLE 1

| 1 - Ratio Noir/Plastifiant | | | | | | | | | | |
|---|---|---|---|---|---|---|---|---|---|---|
| Noir/Plastifiant indice | 150.38 | 140.30 | 130.23 | 120.15 | 110.08 | 100.00 | 89.92 | 79.85 | 69.77 | 59.70 | 49.62 |
| Valeur de sévérité | 1 | 1.10 | 1.20 | 1.30 | 1.40 | 1.50 | 1.60 | 1.70 | 1.80 | 19.0 | 2.00 |
| 2 - Présence Résine | | | | | | | | | | |
| Résine tackifiante indice | 0.00 | 20.00 | 40.00 | 60.00 | 80.00 | 100.00 | 120.00 | 140.00 | 160.00 | 180.00 | 200.00 |
| Valeur de sévérité | 1 | 1.10 | 1.20 | 1.30 | 1.40 | 1.50 | 1.60 | 1.70 | 1.80 | 1.90 | 2.00 |
| 3 - Cohésion Mélange | | | | | | | | | | |
| Fraction volumique d'élastomère, Indice | 143 | 134 | 126 | 117 | 109 | 100 | 91 | 83 | 74 | 66 | 57 |
| Valeur de sévérité | 1 | 1.10 | 1.20 | 1.30 | 1.40 | 1.50 | 1.60 | 1.70 | 1.80 | 1.90 | 2.00 |

In an empirical way and according to various criteria of industrial feasibility, a balance is made of the industrial feasibility of several mixtures. The feasibility limit is established for stickiness indexes above 3.5 and 4.5 points.

Examples of Mixtures:

TABLE 2

|  | Sticky KM | Sticky KM blend | Non-sticky KM |
|---|---|---|---|
| 1 - Ratio Carbon black/Plastifier | | | |
| Carbon black/Plastifier index | 94.7 | 75.2 | 117.3 |
| Severity value | 1.55 | 1.75 | 1.33 |
| 2 - Resin presence | | | |
| Tackifying resin index | 132.0 | 112.0 | 20.0 |
| Severity value | 1.66 | 1.56 | 1.10 |
| 3 - Mixture cohesion | | | |
| Volume fraction of elastomer index | 67.2 | 85.4 | 99.4 |
| Severity value | 1.88 | 1.67 | 1.50 |
| Stickiness index | 4.9 | 4.5 | 2.2 |

The two "Sticky KM" and "Sticky KM blend" mixtures, with respective indices 4.9 and 4.5, are not considered to have satisfactory industrial feasibility. However, the machine of the invention allows these mixtures to be produced industrially with a higher productivity compared to conventional machines of the internal mixer or external mixer type.

In order to obtain the mixtures with the desired properties in shorter cycles, the invention preserves all the advantages of a convergent conical two-screw mixer. At the same time, the invention combines the solutions of self-cleaning screws, rams and roller nose systems. In addition, the invention combines these solutions with mobile sleeve solutions. Thus, only one machine is provided that can process a variety of mixtures, including sticky and de-cohesive mixtures, without changing equipment in a mixing plant.

The terms "at least one" and "one or more" are used interchangeably. The ranges that are presented as "between a and b" include the values "a" and "b".

Although particular embodiments of the disclosed apparatus have been illustrated and described, it will be appreciated that various changes, additions and modifications can be made without departing from the spirit and scope of this disclosure. Therefore, no limitation should be imposed on the scope of the invention described except those set forth in the appended claim

The invention claimed is:

1. A mixing and extruding machine for manufacturing a rubber mixture, the machine comprising:
   an introduction hopper; and
   a mixer, the mixer being a convergent conical twin-screw mixer including:
   sleeves in which two screws are inclinedly mounted between an opening and an outlet, each screw of the two screws including a thread having a thread tip and a channel defined between adjacent portions of the thread, the channel including a core surface, the opening being disposed upstream of the sleeves and connected to the introduction hopper for the introduction hopper to feed the two screws, the outlet being disposed downstream of the sleeves to discharge the rubber mixture at the end of a mixing cycle;
   one or more motors coupled to the two screws to rotate the two screws in the sleeves during the mixing cycle; and
   one or more movable doors provided at the outlet and movable to allow, during the mixing cycle, the evacuation and shaping of the rubber mixture,
   wherein the two screws are mounted in the mixer such that the thread tips of each screw tangentially contact the core surface of the opposite screw in order that the two screws remain substantially in contact with each other when rotating the two screws with a constant predetermined angle and center distance that facilitates self-cleaning, and
   wherein an inner surface of each sleeve is predefined in order to determine a predetermined distance between each of the thread tips and the inner surface of a corresponding sleeve such that the thread tips of each of the two screws remain in tangential contact with the inner surfaces of the sleeves and preventing the retention of the rubber mixture on the inner surfaces.

2. The machine of claim 1, wherein each screw of the two screws has an outer contour, and the machine further comprises a ram having an inner surface with a shape that is complementary to the outer contour of each of the two screws, the ram being movable along an inside of the introduction hopper between a raised position, where the two screws remain accessible to introduce the rubber mixture, and a lowered position, where the inner surface of the ram forms an upper part of the mixer.

3. The machine of claim 2, further comprising a roller nose system including two counter-rotating rollers disposed downstream of the outlet to form a sheet of the rubber mixture exiting the mixer.

4. The machine of claim 3, further comprising one or more mobile sleeves that are arranged top-down toward the outlet, each mobile sleeve of the one or more mobile sleeves including a support surface having a predetermined surface area as a function of elasticity of the rubber mixture, and each mobile sleeve of the one or more mobile sleeves including mobile elements that move in a linear movement relative to the outlet in order to adjust a predetermined space between the sleeves and the two screws, and the linear movement being defined between a closed position of the mobile sleeves to promote mixing, and an open position of the mobile sleeves so as to promote the flow of the rubber mixture inside the mixer.

5. The machine of claim 1, wherein the two screws have an interpenetrated profile, a conjugate profile, or both.

6. The machine of claim 1, wherein the mixer comprises an interpenetrating contra-rotating twin-screw mixer, with the two screws mounted in the sleeves with one door of the one or more movable doors at an end of the sleeves to marry the shape of the two screws.

7. The machine of claim 6, wherein the two screws are symmetrical.

8. The machine of claim 6, wherein the two screws are asymmetrical.

9. The machine of claim 1, wherein the sleeves include cooling channels for controlling the temperature of the rubber mixture during the mixing cycle.

10. The machine of claim 3, wherein the one or more movable doors comprise one or more sliding shutters installed relative to the outlet so that the one or more sliding shutters move linearly between a closed position, in which the one or more sliding shutters prevent the mixer from discharging the rubber mixture, and an open position, in which the one or more sliding shutters serve to prevent the rubber mixture from escaping from sides of the counter-rotating rollers in order to force the rubber mixture to pass between the counter-rotating rollers.

11. A mixing process for mixing and extruding the rubber mixture from the machine of claim 1, the process comprising the steps of:

a step of rotating the two screws forward with the one or more movable doors closed;

a step of introducing the rubber mixture to the machine, during which the two screws continue to rotate and the one or more movable doors remain closed; and a step of emptying the machine, during which the one or more movable doors open to discharge the rubber mixture from the outlet of the machine toward a downstream process and in which the two screws continue to rotate until the mixer is empty.

12. The mixing process of claim 11, wherein the step of introducing the rubber mixture to the machine comprises introducing raw materials to form the rubber mixture.

13. The mixing process of claim 11, wherein the step of introducing the rubber mixture to the machine comprises introducing one or more masterbatches.

14. The mixing process of claim 11, further comprising a step of rotating the two screws in reverse with the one or more movable doors closed, during which the two screws rotate in an opposite direction with respect to the step of rotating the two screws forward.

15. The mixing process of claim 14, wherein the machine further comprises one or more mobile sleeves that are arranged top-down toward the outlet, each mobile sleeve of the one or more mobile sleeves including a support surface having a predetermined surface area as a function of elasticity of the rubber mixture, and each mobile sleeve of the one or more mobile sleeves including mobile elements that move in a linear movement relative to the outlet in order to adjust a predetermined space between the sleeves and the two screws, and the linear movement being defined between a closed position of the mobile sleeves to promote mixing, and an open position of the mobile sleeves so as to promote the flow of the rubber mixture inside the mixer, and wherein the one or more movable doors are open at the end of the mixing cycle; and the one or more mobile sleeves are in the closed position at the end of the mixing cycle.

* * * * *